United States Patent [19]
Martin

[11] 3,979,674
[45] Sept. 7, 1976

[54] RADIATING TELECOMMUNICATION SYSTEMS

[75] Inventor: David James Reginald Martin, Leatherhead, England

[73] Assignee: Coal Industry (Patents) Limited, London, England

[22] Filed: June 12, 1975

[21] Appl. No.: 586,280

[30] Foreign Application Priority Data
Aug. 7, 1974 United Kingdom............... 34805/74

[52] U.S. Cl.................................. 325/4; 325/51
[51] Int. Cl.².................................. H04B 7/26
[58] Field of Search ............ 325/1, 3, 4, 23, 51–54, 325/62; 178/69 R, 69 A, 71 N; 179/82, 15 AL; 246/8, 63 C

[56] References Cited
UNITED STATES PATENTS

| | | | |
|---|---|---|---|
| 2,980,793 | 4/1961 | Daniel.................................. | 179/82 |
| 3,585,505 | 6/1971 | Ogilvy................................... | 325/51 |
| 3,750,020 | 7/1973 | Baba et al............................. | 325/51 |
| 3,916,311 | 10/1975 | Martin ................................ | 325/53 |

*Primary Examiner*—Robert L. Griffin
*Assistant Examiner*—Jin F. Ng
*Attorney, Agent, or Firm*—James C. Wray

[57] ABSTRACT

A telecommunication system used in a mine has a long aerial along a tunnel which radiates signals to a mobile station. Signals from the station are radiated back to the line. Repeaters are included along the line to make up power losses. A connection of an extra length of line is made on the output side of each repeater and extends back parallel to the line for a distance of up to half the distance between adjacent repeaters. This extra line reduces the attenuation of signal power between repeaters.

10 Claims, 9 Drawing Figures

RADIATING TELECOMMUNICATION SYSTEMS

This invention relates to telecommunication systems of the kind including a base station joined to a radiating transmitting line which has at least one repeater along its length and which is arranged to transmit signals to or receive signals from a mobile station in the vicinity of the line.

It is known that radio communication between a fixed and a mobile station may be obtained in a tunnel or mine or along any linearly designated route by installing a radiating or leaky transmission cable, which may conveniently take the form of a coaxial cable having a perforate or incomplete outer conductor, along the route so to be served and connecting the leaky cable to the fixed base station in lieu of a normal aerial. Communication between the fixed and mobile stations then takes place through leakage fields around the cable. The longitudinal range of such systems in terms of the length of leaky cable which may usefully be connected to a base station is limited by the internal longitudinal attenuation in the cable, which results in a progressive weakening of the signals coupled between the fixed and mobile stations as the length of line between them increases even through the leakage field relative to the energy within the cable at any point on the line is constant.

It is also known that this progressive weakening of the signal within the line can be compensated periodically by inserting amplifiers or repeaters in series with the leaky cable. For example, if the attenuation of the cable at the frequency used is 30 dB/km, then a repeater of gain equal to 30 dB may conveniently be inserted after every kilometer of cable. Where two-way communication is required, such repeaters may be two-way devices; alternatively, two-way communication may be achieved using a series or chain of simple one-way repeaters if the fixed base station is separated into its constituent transmitter and receiver and connected to opposite extremities of the leaky-cable system, as is described in British patent specification No. 1371291 and corresponding U.S. Pat. No. 3,916,311.

It is a disadvantage of such systems that the strength of the signal transmitted between the fixed and mobile stations varies according to the position of the mobile station with respect to the nearest repeaters. In the example given above, for instance, the transmitted signal would vary by 30 dB, corresponding to the attenuation of a section of cable between adjacent repeaters. Ordinarily, such variation could only be reduced by spacing the repeaters at more frequent intervals and reducing the gain of each correspondingly.

It is an object of the present invention to reduce such variation of signal, but without so reducing the repeater spacing.

According to the present invention a telecommunication system includes a base station joined to a radiating transmission line having at least one repeater along its length and arranged to transmit signals to or receive signals from a mobile station in the vicinity of the line, and a further length of radiating transmission line connected to the line adjacent the repeater on one side thereof and extending parallel or substantially in parallel with the line on the other side of the repeater.

There are preferably a plurality of repeaters spaced along the line and the said further length of transmission line connected to the or each repeater extends no further than halfway along the length of transmission line joining two repeaters. Where the base station is a transmitter the further length of radiating transmission line is connected to the output of the repeater and where the base station is a receiver the line is connected to the input to the repeater. The repeater may be bi-directional or unidirectional. The repeaters are preferably devices having a primary amplification function although they may also include filter circuitry.

Where in a system further lines extend on either side of repeaters in different directions the free ends of these lines may be joined to the free ends of adjacent lines through a choke.

In order that the invention may be readily understood two examples of telecommunication systems and a modification of one of them will now be explained with reference to the accompanying drawings.

In the drawings,

FIG. 1(c) shows the system of FIG. 1(a) supplemented to accord with the present invention; while

Figure 2A:
Figure 2B:
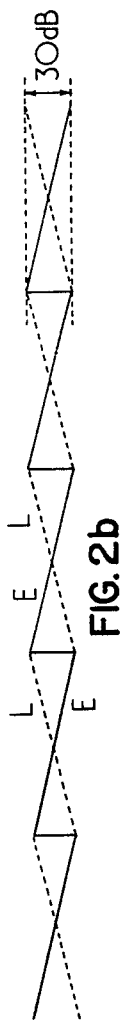

Similarly FIG. 2(a) shows a second known form of transmission line and FIG. 2(b) an explanatory waveform.

Figure 2C:
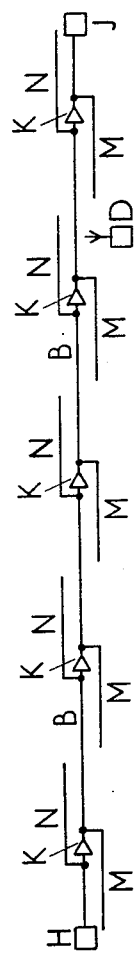
Figure 2D:
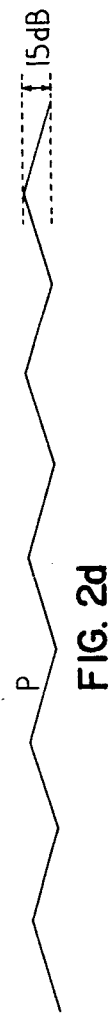

FIG. 2(c) shows the system of FIG. 2(a) supplemented to accord with the invention; and FIG. 2(d) shows the waveform thus achieved.

Figure 2E:
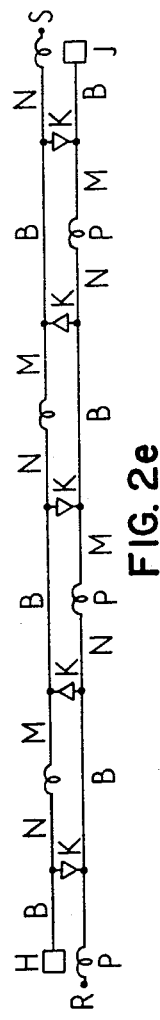

FIG. 2(e) shows a modification of FIG. 2(c).

Figure 1A:
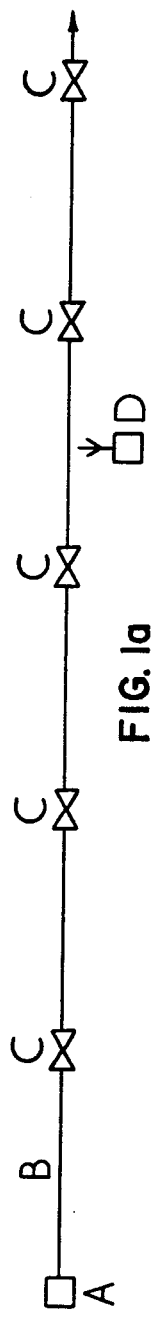
FIG. 1(a) shows a first known form of telecommunication system with the transmitter signal waveform along its length shown at 1(b).
Figure 1B:
Figure 1C:
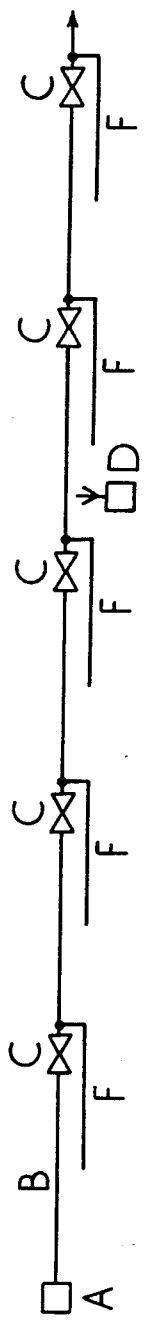
Figure 1D:
FIG. 1(d) shows the waveform achieved by the invention.

Referring first to FIG. 1 of the drawings and particularly to FIG. 1(a) this shows a typical normal leaky-feeder system having a fixed base station A, comprising a transmitter and receiver, connected to a radiating or leaky transmission cable B which runs through a mine or tunnel or along a route to be provided with radio communication. Communication with an adjacent mobile or personal radio station D in the vicinity of cable B is by means of the leakage electromagnetic fields associated with leaky cable B. At intervals, typically every kilometer, a two-way repeater C is inserted in series with leaky cable B to restore the signal level and compensate for the loss incurred in the preceding section of cable. In these circumstances, the transfer of signal between the fixed station A and a mobile or personal station D will depend on the position along the cable B of the mobile station in a manner illustrated in a simplified graphical form in FIG. 1(b). In this example it is assumed that the loss in each section of cable between successive repeaters C is 30 dB and that each repeater is designed exactly to make up this loss. The sawtooth waveform type of variation as depicted by the solid line E then results.

In the invention being described here an auxiliary length of leaky cable F is connected into the main leaky cable at a point immediately following each repeater, as viewed from the base station, and run back past the repeater towards the base station for a distance which may advantageously be equal to half the spacing between successive repeaters. Such tailback cable may be installed close to the main cable and parallel to it, or may be spaced some distance away such as at the opposite side of a tunnel being served. The purpose of this tailback is to supplement the radiated signal and to provide a higher level of signal transmission between base and mobile sets in those regions where FIG. 1(b)

denotes the transmission to be weakest. The effect is to modify the sawtooth pattern of the transmitted signal into the form illustrated at G in FIG. 1(d), where it is seen that the total variation has been reduced from 30 dB to 15 dB. The minimum value of the transmitted signal has thus been increased by 15 dB without at the same time increasing the maximum level encountered. It has not been necessary to increase the number of repeaters used or to increase their gain or power-output characteristics. It will be understood that the output signal from each repeater is divided equally between the continuation of the main cable and the tailback cable, or in any proportion which may be suitable to particular conditions. Since the cost of repeaters is relatively high compared to the cost of cable a considerable saving in cost is achieved compared with the alternative of achieving the same end by using more repeaters.

The invention may also be used advantageously in conjunction with the system in U.S. Pat. No. 3,916,311 using unidirectional repeaters. This system is shown in FIG. 2(a), where a fixed radio transmitter H and a fixed radio receiver J are connected to opposite ends of a leaky coaxial cable B which is installed in the tunnel or mine or along the route where communication with mobile radio stations such as the one shown at D, is required. The leaky cable in this case is interrupted at intervals by the insertion of unidirectional repeaters K. Again, in a typical example where the loss in each length of cable between successive repeaters is 30 dB and the gain of each repeater is also 30 dB, the signal as transmitted by the fixed transmitter H and received by a mobile station D will vary according to its position in the manner depicted by the solid line E in FIG. 2(b). The signal transmitted by the mobile station and received by the fixed receiver J will vary according to the position of the mobile set in the manner depicted by the dashed line L in FIG. 2(b). In both cases it will be seen that the received signal varies over a range of 30 dB as in the corresponding example using two-way repeaters.

Applying the present invention in this case requires that two tailback cables be taken from each repeater as shown in FIG. 2(c), the one at M being connected close to the output of a repeater K and carried back towards H in parallel with the main leaky cable connected to the input, and the other at N being connected close to the input of the repeater and carried forward towards J in parallel with the main leaky cable connected to the output of the repeater K. As before, each tailback cable should advantageously extend for half the distance between the repeaters.

In this case also the variation in the transmitted signal between fixed and mobile stations due to the varying position of the mobile station with respect to the repeaters is halved, so that a previous 30 dB variation is reduced by the tailback arrangement to 15 dB, as shown in FIG. 2(d).

It will be noted from FIG. 2(c) that in order to extend the benefit of the reduction in variation completely to each extremity of the system, that is to the fixed transmitter H and the fixed receiver J, it is necessary to halve the length of the section of main cable nearest each extremity and so the total number of repeaters in the system in this case is increased by one.

It is to be understood that the variations in transmitted signal from fixed station to mobile station or from mobile station to fixed station which are reduced by this invention are essentially those which are caused directly by variations in position of the mobile station with respect to the repeaters and exclude any variations additionally caused by standing-wave effects or multi-path propagation in the vicinity of the mobile station.

In a modification of the invention, the free extremities of the tailback cables M and N which are respectively in juxtaposition in FIG. 2(c) may be linked by radio-frequency chokes P to provide a second continuous auxiliary path for direct or low-frequency currents for the length of the system as shown in FIG. 2(e), with access connections as indicated at R and S. Thus, in the example as illustrated in FIG. 2(e), an auxiliary direct-current or low-frequency link to or from the fixed transmitter H is available at S, and corresponding auxiliary connection to or from the fixed receiver J is available at R. Either or both of such links may be used for the purpose of supplying direct-current power to the repeaters or for controlling the transmitter or receiver from the distant end of the system. Normally, only one such auxiliary link is available in a repeater system, such as in FIG. 2(a) formed by the main radiating coaxial cable itself.

I claim:

1. A telecommunication system including a base station and a mobile station, a radiating transmission line having at least one repeater along its length, and the base station being arranged through the line to transmit signals to and to receive signals from the mobile station, and a further length of radiating transmission line connected to the said radiating transmission line adjacent the repeater on one side thereof and extending substantially in parallel with the said radiating transmission line on the other side of the repeater.

2. A system as claimed in claim 1 in which the further length of radiating transmission line connected to the repeater extends no further than halfway along the length of transmission line joining the repeater and the adjacent base station.

3. A system as claimed in claim 1, in which the base station is a transmitter and the further length of radiating transmission line is connected to the output of the repeater.

4. A system as claimed in claim 1 in which the base station is a receiver and the further length of radiating transmission line is connected to the input of the repeater.

5. A system as claimed in claim 1 and including a plurality of repeaters spaced along the radiating transmission line and a separate further length of transmission line being connected to each repeater.

6. A system as claimed in claim 5 in which the further length of radiating transmission line connected to each repeater extends no further than halfway along the length of transmission line joining two repeaters.

7. A system as claimed in claim 5 in which the repeaters are bi-directional.

8. A system as claimed in claim 5 in which the repeaters include filter circuitry.

9. A system as claimed in claim 5 in which the repeaters are uni-directional and in which further lines extend on either side of the repeaters.

10. A system as claimed in claim 9 in which the free end of a said further line connected to a repeater at the end of the system provides at its free end an auxiliary connection for supplying power to the repeaters.

* * * * *